United States Patent
Gryaznov

(10) Patent No.: US 8,438,637 B1
(45) Date of Patent: May 7, 2013

(54) SYSTEM, METHOD, AND COMPUTER PROGRAM PRODUCT FOR PERFORMING AN ANALYSIS ON A PLURALITY OF PORTIONS OF POTENTIALLY UNWANTED DATA EACH REQUESTED FROM A DIFFERENT DEVICE

(75) Inventor: Dmitry O. Gryaznov, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 1025 days.

(21) Appl. No.: 12/142,490

(22) Filed: Jun. 19, 2008

(51) Int. Cl.
*H04L 29/06* (2006.01)

(52) U.S. Cl.
USPC .......................................................... 726/22

(58) Field of Classification Search .................. None
See application file for complete search history.

(56) References Cited

U.S. PATENT DOCUMENTS

| | | | | |
|---|---|---|---|---|
| 6,357,004 | B1* | 3/2002 | Davis | 713/100 |
| 6,704,874 | B1* | 3/2004 | Porras et al. | 726/22 |
| 7,716,736 | B2* | 5/2010 | Radatti et al. | 726/22 |
| 2006/0259967 | A1* | 11/2006 | Thomas et al. | 726/22 |

OTHER PUBLICATIONS

"File Sharing," Wikipedia, last modified Jun. 13, 2008, http://en.wikipedia.org/wiki/File_sharing.

* cited by examiner

*Primary Examiner* — Hadi Armouche
*Assistant Examiner* — Simon Kanaan
(74) *Attorney, Agent, or Firm* — Wong, Cabello, Lutsch, Rutherford & Brucculeri, L.L.P.

(57) ABSTRACT

A system, method, and computer program product are provided for performing an analysis on a plurality of portions of potentially unwanted data each requested from a different device. In use, a detection of potentially unwanted data (e.g., potentially malicious data) is identified based on a first analysis. Additionally, receipt of a plurality of portions of the potentially unwanted data is requested, where each of the plurality of portions is requested from a different device. Further, a second analysis is performed on the plurality of portions of the potentially unwanted data for determining whether the potentially unwanted data is unwanted (e.g., malicious).

17 Claims, 5 Drawing Sheets

SYSTEM, METHOD, AND COMPUTER PROGRAM PRODUCT FOR PERFORMING AN ANALYSIS ON A PLURALITY OF PORTIONS OF POTENTIALLY UNWANTED DATA EACH REQUESTED FROM A DIFFERENT DEVICE

FIELD OF THE INVENTION

The present invention relates to security systems, and more particularly to data retrieval and analysis.

BACKGROUND

Security systems have traditionally been concerned with identifying unwanted (e.g., malicious) data and acting in response thereto. For example, data which is undetermined to be malicious may be communicated to a security system, and the data may further be analyzed by the security system for determining whether the data is malicious. However, traditional techniques utilized for communicating data to security systems for analysis purposes have generally exhibited various limitations.

For example, multiple entities associated with the security system may each encounter an identical copy of data which is undetermined to be malicious, and each of these entities may communicate the identical copies of the data to the security system for analysis purposes. Since the security system is capable of determining whether the data is malicious utilizing only one of such copies, communication of multiple copies to the security system is oftentimes unnecessary and thus contributes to unnecessary resource consumption. Just by way of example, in the event of an outbreak of malicious data that is yet to be determined to be malicious, a large number of identical copies of the data may all be sent to the security system from multiple different entities. This may result in unnecessary processing of identical copies of the data at the security system, wasted communication resources, etc.

There is thus a need for overcoming these and/or other issues associated with the prior art.

SUMMARY

A system, method, and computer program product are provided for performing an analysis on a plurality of portions of potentially unwanted data each requested from a different device. In use, a detection of potentially unwanted data (e.g., potentially malicious data) is identified based on a first analysis. Additionally, receipt of a plurality of portions of the potentially unwanted data is requested, where each of the plurality of portions is requested from a different device. Further, a second analysis is performed on the plurality of portions of the potentially unwanted data for determining whether the potentially unwanted data is unwanted (e.g., malicious).

DETAILED DESCRIPTION

Figure 1:
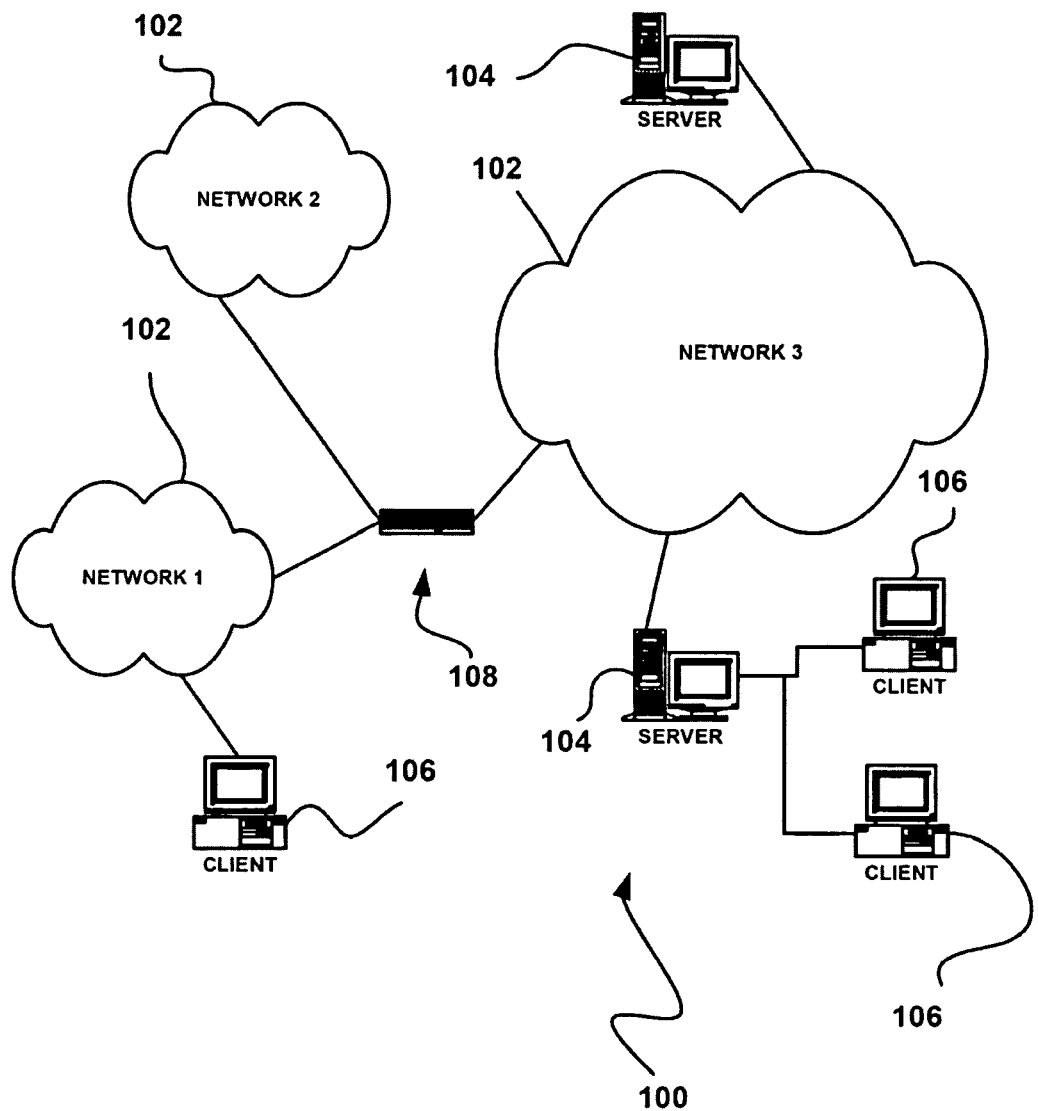
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g., printer, etc.), any component of a computer, and/or any other type of logic. In order to facilitate communication among the networks 102, at least one gateway 108 is optionally coupled therebetween.

Figure 2:
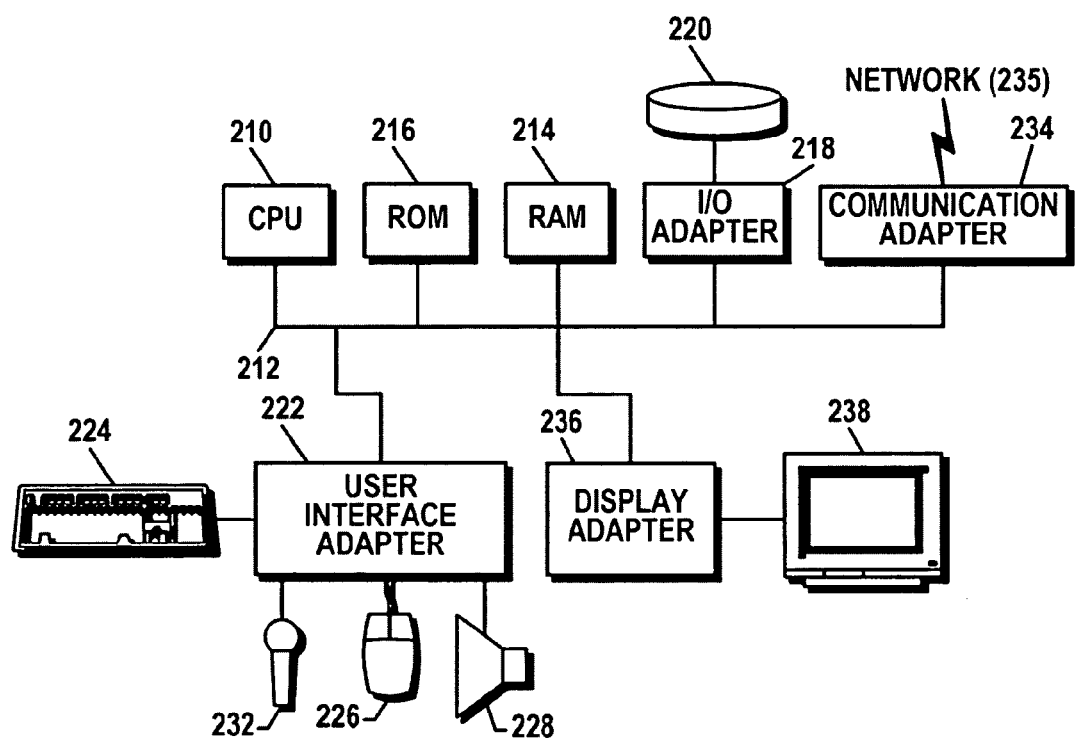
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
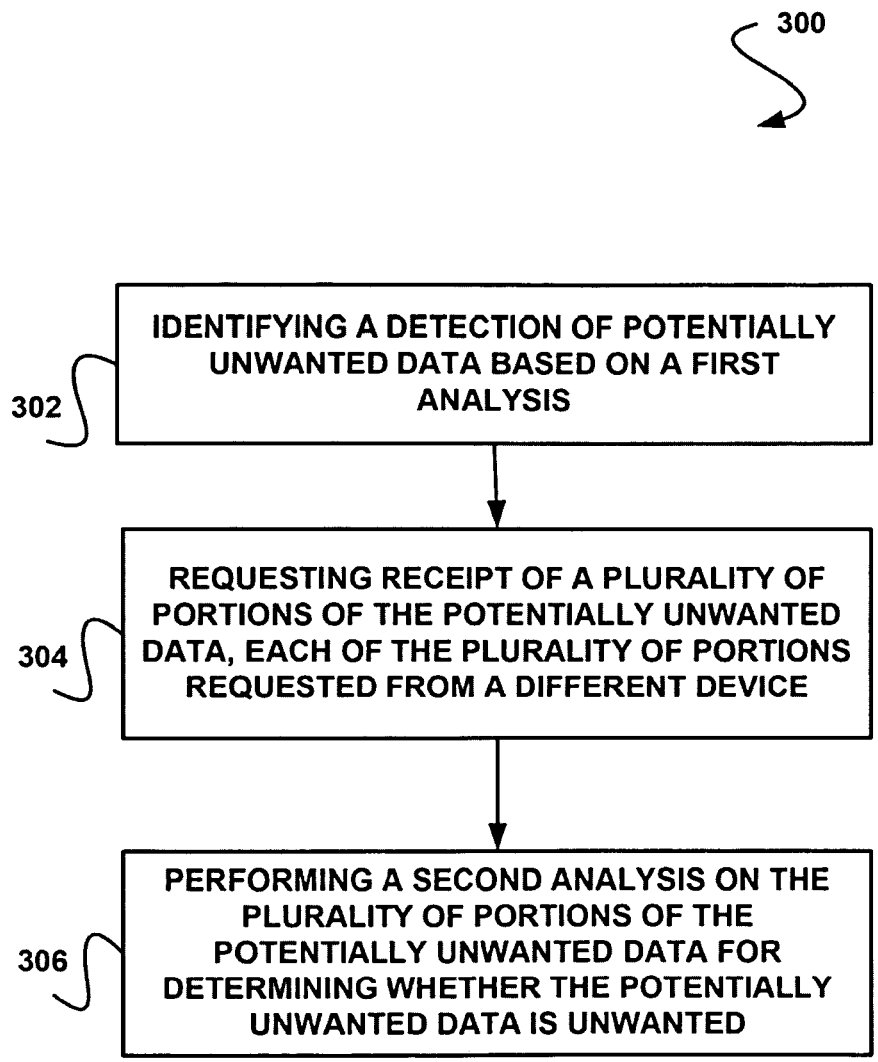
FIG. 3 shows a method for performing an analysis on a plurality of portions of potentially unwanted data each requested from a different device, in accordance with one embodiment.

FIG. 3 shows a method 300 for performing an analysis on a plurality of portions of potentially unwanted data each requested from a different device, in accordance with one embodiment. As an option, the method 300 may be carried out in the context of the architecture and environment of FIGS. 1 and/or 2. Of course, however, the method 300 may be carried out in any desired environment.

As shown in operation 302, a detection of potentially unwanted data (e.g., potentially malicious data) is identified based on a first analysis. In the context of the present description, the potentially unwanted data may include any data that is potentially unwanted. In one embodiment, the potentially unwanted data may include data that has not been identified prior to the first analysis.

In another embodiment, the potentially unwanted data may include data for which it is unknown whether such data is unwanted (e.g., malicious, etc.). For example, the potentially unwanted data may not necessarily match a signature of known unwanted data (e.g., data previously determined to be malicious). As another example, the potentially unwanted data may not necessarily match a signature of known wanted data (e.g., data previously determined to not be malicious). Such data may be determined to be potentially unwanted based on a scan of the data (e.g., against signatures of known wanted data and/or known unwanted data, etc.), as an option.

In yet another embodiment, the potentially unwanted data may include data that is determined to be suspicious based on the first analysis. For example, the data may be determined to have one or more characteristics of malware based on the first analysis. In another example, the data may be determined to be a possible new variant of existing malware. To this end, the potentially unwanted data may include data that is determined to potentially include malware, spyware, adware, etc., based on the first analysis.

Additionally, in one embodiment, the first analysis may include monitoring a device (e.g., for the potentially unwanted data). For example, the first analysis may include monitoring a client device. Accordingly, the first analysis may optionally be performed at the client device (e.g., for detecting the potentially unwanted data). In another embodiment, the monitoring may be performed in real-time. In yet another embodiment, the monitoring may be performed periodically.

In still another embodiment, the first analysis may include a heuristic analysis. In yet another embodiment, the first analysis may include a behavioral analysis. For example, the behavior of data on the client device may be analyzed. In yet another embodiment, the first analysis may include scanning the client device. Of course, however, the first analysis may be performed in any manner capable of resulting in detection of the potentially unwanted data.

Further, in another embodiment, the identification of the detection may include receiving a notification of the detection. For example, the identification of the detection may include receiving a notification of the detection from the client device. Such notification may be received over a network, as an option. Further, the notification may indicate a name of the potentially unwanted data (e.g., a file name) and/or any other information capable of being utilized to identify the potentially unwanted data. It should be noted, however, that the detection of the potentially unwanted data may be identified in any desired manner.

In another embodiment, the identification of the detection may include receiving a hash of the potentially unwanted data. For example, a hash of the potentially unwanted data may be sent by the client device. In yet another embodiment, the identification of the detection may include receiving a response to a query. For example, a query may be sent to the client device inquiring about the detection of potentially unwanted data, and the notification of the detection may be sent in response to the query, such that the detection may be identified.

Additionally, in operation 304, receipt of a plurality of portions of the potentially unwanted data is requested, where each of the plurality of portions is requested from a different device. In the context of the present description, the portions may include any part (e.g., sub-part, etc.) of the potentially unwanted data. For example, the portions may include part of a program, a text file, a data file, etc. that includes the potentially unwanted data. It should be noted that the portions may each be of any desired size (e.g., may be the same size, different sizes, etc.).

Furthermore, in one embodiment, the different devices from which the portions are requested may include different client devices. In another embodiment, the different devices may all have at least one similar characteristic. For example, the different devices may all include a program capable of performing the first analysis. In another example, each of the different devices may have been determined to have detected the potentially unwanted data (e.g., based on a notification received therefrom indicating such detection, etc.).

In another embodiment, the request for the receipt of the portions may include querying the different devices for the portions of the potentially unwanted data. For example, the different devices may each be requested to send (e.g., upload, etc.) a different portion of the potentially unwanted data. As an option, the different devices may each be requested to send a different portion of the potentially unwanted data over a network. Thus, each request sent to each of the different devices may indicate in any desired manner a different portion of the potentially unwanted data that is requested to be received.

As an option, any of the portions may be requested from a plurality of different devices. Just by way of example, one of the portions may be requested from a first device. However, the first device may be unable to respond to the request. For example, the request for such portion may fail due to the first device being unavailable to respond to the request (e.g. the first device being offline, etc.). As another example, the request for such portion may fail based on an occurrence of a time out (e.g. resulting from an inadequate network connection speed being used by the first device to communicate the portion, etc.). Thus, the portion may be requested from a second device that is different from the first device in response to a determination that the first device is unable to respond to the request.

To this end, the portion may be received from the first device and the second device, in one embodiment, based on the request for such portion being sent to both the first device and the second device. For example, the portion may be received from the second device, and the portion may optionally be received from the first device (e.g. after a delay, etc.). Since the portions received from the first device and the second device may be duplicates, one of the portions received from the first device and the second device may optionally be discarded. For example, the portion that is received unexpectedly (e.g. due to the determination that the first device is unavailable, at least temporarily, to respond to the request) may be discarded.

Further, in operation 306, a second analysis is performed on the plurality of portions of the potentially unwanted data for determining whether the potentially unwanted data is unwanted (e.g., malicious). To this end, the second analysis may be performed on the portions in response to receipt of the portions from the different devices from which receipt was requested. With respect to the present description, the second analysis may include any analysis capable of utilizing the portions to determine whether the potentially unwanted data is unwanted. For example, the second analysis may including determining whether any of the portions, the combination of all of the portions, etc. includes unwanted data (e.g., malware, etc.).

In one embodiment, performing the second analysis may include performing a scan on one or more of the plurality of portions. In another embodiment, performing the second analysis may include running the plurality of portions in a controlled environment (e.g., a virtual machine, etc.). In still another embodiment, performing the second analysis may include decrypting the plurality of portions.

Additionally, in one embodiment, the potentially unwanted data may be determined to be unwanted if it is determined that any of the portions contain malware via the second analysis. For example, the potentially unwanted data may be determined to be unwanted if the portions contain a virus, adware, spyware, etc. In another embodiment, the potentially unwanted data may be determined to be unwanted if it is determined that any of the portions perform an action that is unwanted during the second analysis.

In this way, it may be determined whether potentially unwanted data is unwanted by requesting portions of such potentially unwanted data from multiple different devices and further analyzing such portions for unwanted data. Requesting the portions of unwanted data from the different devices may optionally allow for any automatic receipt of an entirety of the potentially unwanted data from the different devices to be prevented (e.g., for the different devices to refrain from automatically sending an entirety of the potentially unwanted data, etc.). Accordingly, resource consumption, such as bandwidth consumption, may optionally be reduced by reducing the size of the potentially unwanted data received from the different devices from an entirety of such potentially unwanted data to only a portion of such potentially unwanted data.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
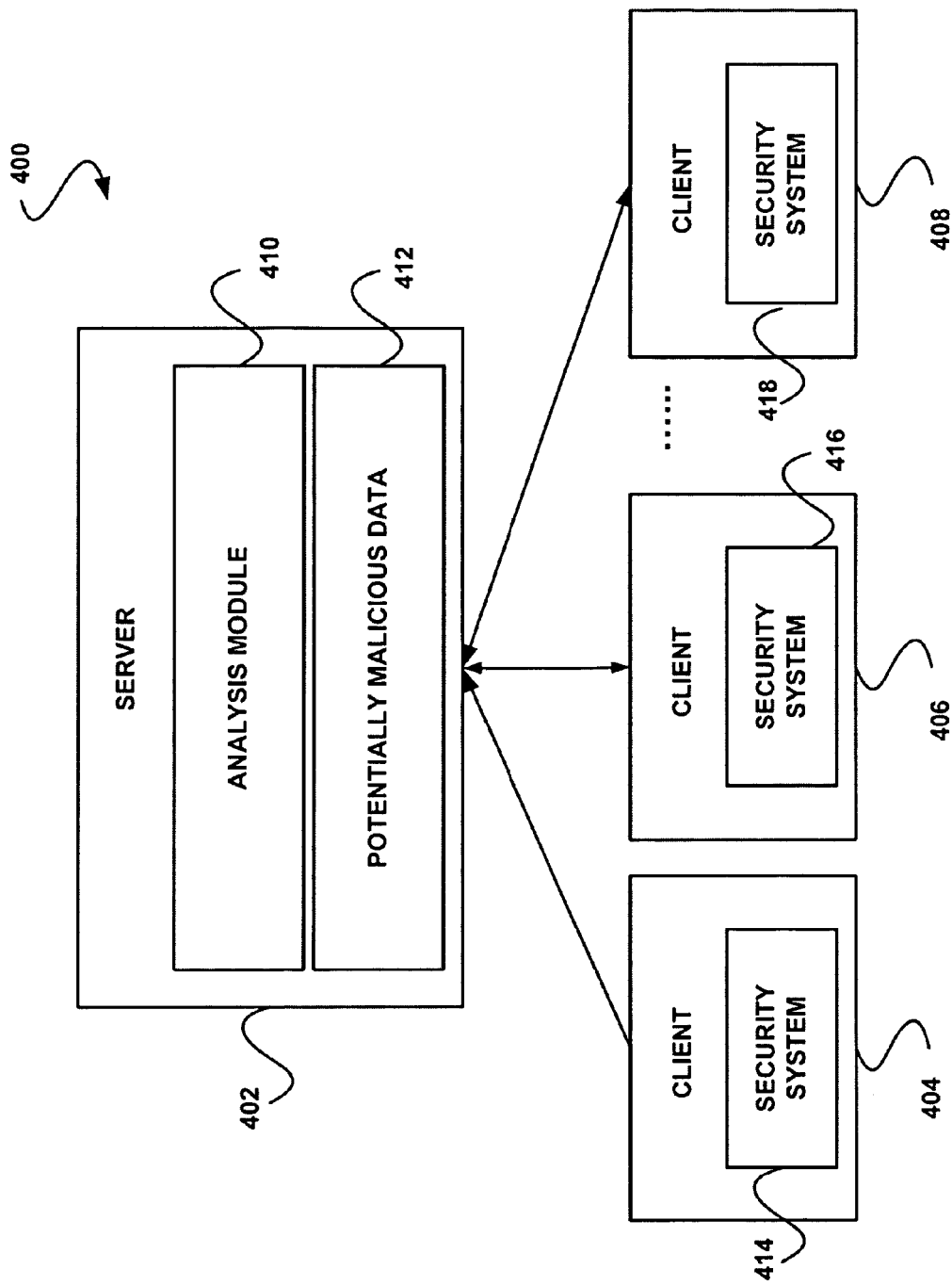
FIG. 4 shows a system for performing an analysis on a plurality of portions of potentially malicious data each requested from a different device, in accordance with another embodiment.

FIG. 4 shows a system 400 for performing an analysis on a plurality of portions of potentially malicious data each requested from a different device, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a server 402 is in communication with clients 404-408. In one embodiment, the clients 404-408 may include any client capable of detecting potentially malicious data that may be in communication with the server 402. For example, the clients 404-408 may include one or more of the clients illustrated in FIG. 1. Additionally, in another embodiment, the server 402 may include any server capable of determining whether the potentially malicious data is unwanted that may be in communication with the clients 404-408. For example, the server 402 may include the server illustrated in FIG. 1.

Additionally, each of the clients 404-408 includes a security system 414-418. In the context of the current embodiment, the security systems 414-418 may include any system utilized by the clients 404-408 to detect malicious data. For example, the security systems 414-418 may include a firewall, an anti-virus system, an anti-spyware system, etc.

In one embodiment, the security systems 414-418 may be constantly running on the clients 404-408. In another embodiment, the security systems 414-418 may periodically run on the clients 404-408. Of course, however, the security systems 414-418 may interact with the clients 404-408 in any manner.

In one embodiment, a first analysis may be performed at each of the clients 404-408. For example, the security systems 414-418 of the clients 404-408 may perform the first analysis on the clients 404-408 in order to detect potentially malicious data located (e.g., stored, etc.) on the clients 404-408. More specifically, the security systems 414-418 may scan the clients 404-408 for potentially malicious data, may monitor the clients 404-408 in order to detect potentially malicious data, may perform a behavioral analysis for detecting the potentially malicious data, may perform a heuristic analysis for detecting the potentially malicious data, etc.

Additionally, in one embodiment, the server 402 may identify the detection of the potentially malicious data. For example, the server 402 may be alerted of the detection by security systems 414-418 of the detection of the potentially malicious data located on the clients 404-408 in response to such detection by the security systems 414-418. In another embodiment, the server 402 may query the clients 404-408 (e.g., periodically, etc.) regarding any detection by security systems 414-418 of potentially malicious data located on the clients 404-408, and may receive a response from the clients 404-408 regarding whether the potentially malicious data has been detected.

Further, in one embodiment, the server 402 may request receipt of a plurality of portions of the potentially malicious data for which detection has been identified by the server 402, where each of the portions are requested from a different client 404-408. For example, the server 402 may request a first portion of the potentially malicious data from client 404, a second portion of the potentially malicious data from client 406, a third portion of the potentially malicious data from client 408, etc. To this end, the server 402 may receive each portion of the potentially malicious data from the clients 404-408 based on the request for such portions. In another embodiment, each of the portions of the potentially malicious data may be reassembled at the server 402 in order to form the potentially malicious data 412 stored on the server 402.

Further still, in one embodiment, a second analysis may be performed on the potentially malicious data 412 at the server 402 for determining whether the potentially malicious data 412 is malicious. In another embodiment, an analysis module 410 of the server 402 may perform the second analysis on the potentially malicious data 412. Such analysis module 410 may optionally be included in a security system (not shown) of the server 402.

In the context of the current embodiment, the analysis module 410 may include any module capable of performing an analysis on the potentially malicious data 412 for determining whether the potentially malicious data 412 is malicious. In one example, the analysis module 410 may reverse engineer the potentially malicious data 412. In another example, the analysis module 410 may run the potentially malicious data 412 in a virtual machine. In this way, the analysis module 410 of the server 402 may determine whether the potentially malicious data 412 detected at the clients 404-408 is in fact malicious data.

Figure 5:
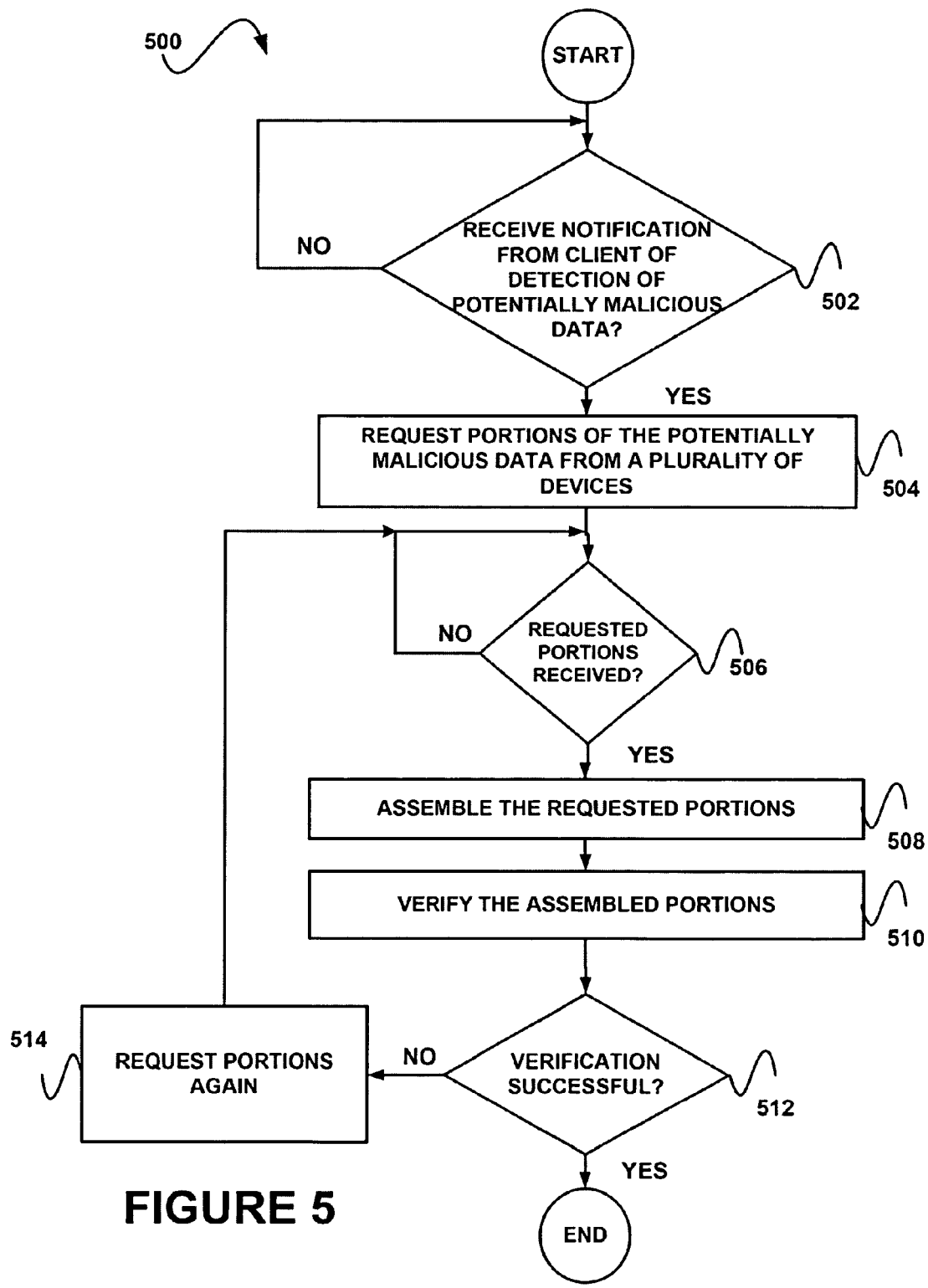
FIG. 5 shows a method for assembling requested portions of potentially malicious data and verifying the assembled portions, in accordance with yet another embodiment.

FIG. 5 shows a method 500 for assembling requested portions of potentially malicious data and verifying the assembled portions, in accordance with yet another embodiment. As an option, the method 500 may be carried out in the context of the architecture and environment of FIGS. 1-4. For example, the method 500 may be carried out using the server 402 of FIG. 4. Of course, however, the method 500 may be carried out in any desired environment. It should also be noted that the aforementioned definitions may apply during the present description.

As shown in decision 502, it is determined whether notification is received from a client of a detection of potentially malicious data. In one embodiment, the client may include any of the clients illustrated in FIG. 1. In addition, in one embodiment, the notification may be received via a network. For example, the notification may be received via one of the networks illustrated in FIG. 1.

Further, in one embodiment, the notification may include a hash of the potentially malicious data. For example, the client may calculate a secure hash for the potentially malicious data using a hash algorithm such as a secure hash algorithm-1 (SHA-1), SHA-256, message-digest algorithm 5 (MD5), etc.

In another embodiment, the notification may include an identifier of the potentially malicious data. For example, the notification may include a name of the potentially malicious data, a size of the potentially malicious data, a file type of the potentially malicious data, etc. In still another embodiment, the notification may include an electronic mail message.

Additionally, in one embodiment, the notification may be received from the client in response to the detection of the potentially malicious data by the client. In another embodiment, the notification may be received from the client in response to a query for identification of any potentially malicious data detected by the client. Further, in another embodiment, it may be determined whether more than one device has detected the potentially malicious data.

Further, in another embodiment, it may be determined whether more than one client has detected the potentially malicious data. In one embodiment, the notification may be compared against additional notifications received from additional clients. For example, the hash of the potentially malicious data that is received from the client may be compared against one or more additional hashes received from additional clients.

If it is determined in decision 502 that notification from the client of detection of the potentially malicious data has not been received, then the method 500 continues to wait for a notification from the client of detection of the potentially malicious data. If it is determined in decision 502 that notification from the client of detection of the potentially malicious data has been received, then in operation 504 portions of the potentially malicious data are requested from a plurality of devices. As an option, each of the requests for a portion of the potentially malicious data may include an identifier of the potentially malicious data, an indication of the portion requested (e.g., using a starting point, size, ending point, etc. of the portion), etc.

In one embodiment, the portions requested from the plurality of devices may all be of equal size. In another embodiment, the portions requested from the plurality of devices may be different sizes. In yet another embodiment, the size of the portions requested from the plurality of devices may be based on a characteristic of an associated one of the devices. Such characteristic may include a connection speed (e.g., network connection speed, available bandwidth, etc.) and/or any other desired characteristic.

For example, the size of the portions requested from the plurality of devices may be based on a connection speed of each device. For instance, a device with a dial-up network connection may receive a request for a smaller portion of the potentially malicious data than a device with a broadband network connection. In one embodiment, the connection speed of each device may be determined by querying each device, monitoring each device, etc. In another embodiment, each of the plurality of devices may be categorized according to the connection speed of the device.

Furthermore, in another embodiment, more than one portion of the potentially malicious data may be requested from any of the plurality of devices. For example, multiple portions of the potentially malicious data may be requested from a device with a high connection speed.

Further still, in another embodiment, the requested portions may be hashed by the plurality of devices. For example, an individual device receiving a request for a portion of the potentially malicious data may create a checksum for their respective portion of the potentially malicious data using the hash algorithm. In another embodiment, the checksum may be coupled to the requested portion. In still another embodiment, the requested portions may be encrypted.

Additionally, in decision 506 it is determined whether the requested portions have been received. For example, it may be determined whether all of the portions of the potentially malicious data requested have been received. As another example, determining whether the requested portions have been received may include determining whether each portion received is capable of being utilized to reconstruct the potentially malicious data (e.g., whether each portion received is associated with an error, etc.).

In one embodiment, each requested portion received may be decrypted. In another embodiment, the requested portions that are received may be hashed. For example, a second checksum may be determined for each of the requested portions that is received. The second checksum may be compared against the checksum coupled to the requested portion. In this way, errors occurring during the receipt of the requested portions may be identified.

If in decision 506 it is determined that the requested portions have not been received, then the determination is repeated until the requested portions have been received (or optionally until a timeout has occurred). However, if it is determined in decision 506 that the requested portions have been received, then in operation 508 the requested portions are assembled. Thus, the requested portions may be assembled after all of the requested portions are received. Such assembling may include constructing the potentially malicious data from the requested portions, for example.

While not shown, it should be noted that the requested portions may be assembled during the receipt thereof. For example, the assembling of the requested portions may be performed in parallel with the receiving of the portions (e.g., as each portion is received, it may be assembled with previously received portions, etc.).

Further, in operation 510 the assembled portions are verified. In one embodiment, the verification of the assembled portions may be performed using a hash. For example, a second hash may be calculated for the assembled portions, and the second hash may be compared against the hash of the potentially malicious data received as notification from the client of the detection of the potentially malicious data.

In another embodiment, one or more elements of the assembled portions may be compared against one or more elements of the notification from the client of the detection of the potentially malicious data. For example, a file size of the assembled portions may be compared against a size of the potentially malicious data received from the client. As a result, it may be determined whether the assembled portions accurately represent the potentially malicious data.

Further still, in decision 512 it is determined whether the verification is successful. If in decision 512 it is determined that the verification is not successful, then the portions are requested again in operation 514. If in decision 512 it is determined that the verification is successful, then the method 500 terminates. In this way, portions of the potentially malicious data may be received from a plurality of different devices and assembled, such that an analysis of such assembled portions representing the potentially malicious data may be performed (e.g., for determining whether the potentially malicious data is malicious, etc.).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium comprising executable instructions stored thereon, the executable instructions to cause a processor to:
    identify a detection of potentially unwanted data based on a first analysis;
    request receipt of a plurality of different portions of the potentially unwanted data, each of the plurality of different portions requested from a different device
    receive the plurality of different portions;
    assemble the plurality of different portions; and
    perform a second analysis on the plurality of different portions of the potentially unwanted data for determining whether the potentially unwanted data is unwanted.

2. The non-transitory computer readable medium of claim 1, wherein the potentially unwanted data includes potentially malicious data.

3. The non-transitory computer readable medium of claim 1, wherein the first analysis is performed at a client device.

4. The non-transitory computer readable medium of claim 3, wherein the first analysis includes monitoring the client device.

5. The non-transitory computer readable medium of claim 1, wherein the first analysis includes a behavioral analysis.

6. The non-transitory computer readable medium of claim 1, wherein the first analysis includes a heuristic analysis.

7. The non-transitory computer readable medium of claim 3, wherein the executable instructions to cause a processor to identify comprise instructions to cause the processor to receive notification of the detection from the client device.

8. The non-transitory computer readable medium of claim 1, wherein each of the different devices have detected the potentially unwanted data.

9. The non-transitory computer readable medium of claim 1, wherein the plurality of different portions are assembled during receipt of the plurality of different portions.

10. The non-transitory computer readable medium of claim 1, further comprising executable instructions to cause the processor to verify the assembled different portions.

11. The non-transitory computer readable medium of claim 10, wherein the executable instructions to cause the processor to verify comprise executable instructions to verify using a hash.

12. The non-transitory computer readable medium of claim 1, wherein a size of the plurality of different portions is based on a characteristic of each device.

13. The non-transitory computer readable medium of claim 1, wherein a size of each of the plurality of different portions requested is based on a network connection speed of an associated one of the different devices.

14. The non-transitory computer readable medium of claim 1, wherein the executable instructions to cause the processor to perform the second analysis comprise executable instructions to cause the processor to determine whether the plurality of different portions include malware, and it is determined that the potentially unwanted data is unwanted if it is determined that the plurality of different portions include the malware.

15. The non-transitory computer readable medium of claim 1, wherein the executable instructions to cause the processor to identify comprise executable instructions to cause the processor to identify using a hash of the potentially unwanted data.

16. A method, comprising:
    identifying a detection of potentially unwanted data based on a first analysis;
    requesting receipt of a plurality of different portions of the potentially unwanted data, each of the plurality of different portions requested from a different device
    receiving the plurality of different portions;
    assembling the plurality of different portions; and
    performing a second analysis on the plurality of different portions of the potentially unwanted data for determining whether the potentially unwanted data is unwanted.

17. A system, comprising:
    a hardware processor configured to identify a detection of potentially unwanted data based on a first analysis, request receipt of a plurality of different portions of the potentially unwanted data, receive the plurality of different portions, assemble the plurality of different portions, each of the plurality of different portions requested from a different device, and perform a second analysis on the plurality of different portions of the potentially unwanted data to determine whether the potentially unwanted data is unwanted.

* * * * *